(12) United States Patent
Wiseman et al.

(10) Patent No.: US 6,405,476 B1
(45) Date of Patent: Jun. 18, 2002

(54) METHOD AND ARTICLE OF MANUFACTURE TO FABRICATE A PLIABLE FISHING LURE

(76) Inventors: James L. Wiseman, 551 E. 83rd St., S., Muskogee, OK (US) 74403; Donald W. Frey, 1008 SW. 9th, Wagoner, OK (US) 74467

( * ) Notice: Subject to any disclaimer, the term of this patent is extended or adjusted under 35 U.S.C. 154(b) by 0 days.

(21) Appl. No.: 09/643,453

(22) Filed: Aug. 22, 2000

(51) Int. Cl.7 ............................................. A01K 85/00
(52) U.S. Cl. ........................................................ 43/42.53
(58) Field of Search ........................... 43/42.53, 42.32, 43/42.34, 42.33; 101/193, 194, 287, 41, 44

(56) References Cited

U.S. PATENT DOCUMENTS

| | | | |
|---|---|---|---|
| 3,528,189 A | 9/1970 | Lilley, Jr. ................. 43/42.33 |
| 3,935,659 A * | 2/1976 | McCallum ................. 43/17.6 |
| 3,990,364 A * | 11/1976 | Paans ......................... 101/115 |
| 4,228,611 A | 10/1980 | McGahee .................. 43/42.53 |
| 4,307,531 A * | 12/1981 | Honse ....................... 43/42.24 |
| 4,464,857 A | 8/1984 | Olszewski ................. 43/42.33 |
| 4,665,642 A | 5/1987 | Steinman .................. 43/42.52 |
| 4,738,199 A * | 4/1988 | Chen .......................... 101/151 |
| 4,835,899 A * | 6/1989 | Helton ....................... 43/42.33 |
| 4,854,071 A | 8/1989 | Kendall ..................... 43/42.33 |
| 5,097,621 A * | 3/1992 | Hnizdor ..................... 43/42.25 |
| 5,251,395 A | 10/1993 | Wicklund ................... 43/42.25 |
| 5,353,703 A | 10/1994 | Rieker ....................... 101/177 |
| 5,564,220 A | 10/1996 | Blicha ........................ 43/42.32 |
| 5,638,631 A | 6/1997 | Guerri et al. .............. 43/42.33 |
| 5,664,363 A * | 9/1997 | Keenan ...................... 424/84 |
| 5,689,910 A | 11/1997 | Kato .......................... 43/42.24 |
| 5,855,089 A | 1/1999 | Hockmeyer et al. ....... 43/42.37 |
| 6,018,902 A | 2/2000 | Gudermuth et al. ....... 43/42.32 |
| 6,182,392 B1 * | 2/2001 | Hubbard .................... 43/42.32 |
| 6,272,787 B1 * | 8/2001 | Link .......................... 427/256 |
| 6,276,266 B1 * | 8/2001 | Dietz et al. ................ 101/41 |

FOREIGN PATENT DOCUMENTS

JP          10221103 A   *   2/2000

* cited by examiner

*Primary Examiner*—Charles T. Jordan
*Assistant Examiner*—John W. Zerr
(74) *Attorney, Agent, or Firm*—Head, Johnson & Kachigian

(57) ABSTRACT

An improved method and apparatus to fabricate a pliable fishing lure whereby a bait fish, or similarly intended likeness can be imprinted upon a fishing lure contour via coordinated utilization of the invention's print processing mold and a four color pad printing apparatus.

4 Claims, 4 Drawing Sheets

METHOD AND ARTICLE OF MANUFACTURE TO FABRICATE A PLIABLE FISHING LURE

REFERENCE TO PENDING APPLICATIONS

This application is not related to any pending applications.

REFERENCE TO MICROFICHE APPENDIX

This application is not referenced in any microfiche appendix.

TECHNICAL FIELD OF THE INVENTION

In general, the present invention relates to the fabrication of fishing lures. In particular, the present invention relates to a method and apparatus for applying a bait fish likeness to a three-dimensional pliable fishing lure contour via a four color pad printing process.

BACKGROUND OF THE INVENTION

Fishing lures presenting a bait fish likeness and methods and apparatus for fabricating such lures are well known in the art. For example:

U.S. Pat. No. 3,528,189 issued on Sep. 15, 1970 to D. L. Lilley Jr. discloses a fishing lure which includes a photographic, lithographic or similar representation of a bait fish contained in a clear plastic form having the exterior shape and surface structure of the bait fish.

U.S. Pat. No. 4,228,611 issued on Oct. 21, 1980 to Welbourne D. McGahee discloses a method and apparatus for producing fishing lures incorporating hook hangers which utilize a bore formed in the lure body as part of the connection mechanism. Injection molding techniques are utilized to fill cavity molds having removable inserts therein.

U.S. Pat. No. 4,464,857 issued on Aug. 14, 1984 to Daniel P. Olszewski discloses a fishing lure and method of fabrication wherein the lure is comprised of a central core which includes hook hangers, leader connection means and a depth controlling weight. The central core is surrounded by an image of the bait being duplicated by the fishing lure and that assembly is encased in a clear plastic shell which includes lenses formed within the plastic material to create a life-like visual impression of various portions of the bait such as eyes, fins and gills.

U.S. Pat. No. 4,665,642 issued on May 19, 1987 to Kenneth Steinman discloses a spoon type fishing lure which includes a body of fish shape lying in a first plane and having front and rear surfaces, and a barbed hook in a right angular plane, including a shank bearing against the rear surface, at one end secured thereto and intermediate its ends extending through one end of the body and terminating a reverse turned barb spaced from the rear surface. A week deflector bar at one end is secured to the forward end of a lure body upon its rear surface with its other end aligned with and spaced from the barb. A peripheral flange on the body extends outwardly of the front surface and receives a paper strip which has a fish imprint thereon and is adhesively mounted upon lure body. A protective layer of transparent plastic material overlies the strip and extends to the flange. In a modified lure, the hook shank is retainingly nested in an elongated groove in the lure body and secured thereto.

U.S. Pat. No. 4,854,071 issued on Aug. 8, 1989 to Jay Kendall discloses a fishing spoon which imitates the effect of light rays passing through a fish. The fishing spoon is comprised of hydrodynamic body or translucent plastic having color zones whereby light passing through assumes the color of the body, the body having an aperture at one end to attach a hook and an aperture at the opposed end to attach a fishing line.

U.S. Pat. No. 5,251,395 issued on Oct. 12, 1993 to Craig Wickland discloses a durable, colorfast elastomer fishing lure dressings and lures including same wherein silicone based colorants are printed onto the dressing material. In a preferred construction, a planar, elastomer substrate is printed on desired upper and lower surfaces with a silicone based colorant in desired patterns. The colorant is permanently fixed in a subsequent thermal curing step. Metalized, accent foils may be bonded to the colorant before curing. The colorant comprises a liquid vinyl silicone carrier which may include varieties of colored pigments, scents, glitters and chromatic particulates.

U.S. Pat. No. 5,353,703 issued on Oct. 11, 1994 to Paul T. Rieker discloses a printing unit system which produces multi-color printing employing a single plate cylinder of a fist diameter and a pair of blanket cylinders of a second diameter one-halve that of the plate cylinder. The blanket cylinders impact associated impression cylinders, also of the second diameter, at the paper path and, in one embodiment, the two impression cylinders mate with a transfer cylinder. By using blanket and impression cylinders having portions with different diameter, multi-color, superimposed images are printed, two colors at a time. The images for the various colors are produced on a single film under computer control for creation of plates for mounting on the plate cylinder and are not adjustable with respect to one another.

U.S. Pat. No. 5,564,220 issued on Oct. 15, 1996 to Peter J. Blicha discloses a fishing lure and method of making the same. The line is made by taking a conventional leadhead jig having a main body, an integral extension, and a hook placing prism tape on both sides of the jig body. The taped jig is then placed in a mold and clear fiberglass resin is cast about it sealing in the prism tape. This is now removed from the mold, painted to simulate a small bait fish and simulated eyes are taped on the jig body. The jig body is dipped into clear fiberglass resin which covers up any imperfections sealing in the simulated eyes. A conventional flexible soft plastic body and tail combination may now be inserted onto the jib extension portion and hook completing the lure.

U.S. Pat. No. 5,638,631 issued on Jun. 17, 1997 to Elmer A. Guerri and William Thomas Mann discloses a fishing lure wherein a polygonal body shape is employed to provide a set of complementary planar surfaces on which a photographic reproduction of a bait fish may be applied to provide a realistic lure without distortion of the photographic portion of the lure.

U.S. Pat. No. 5,689,910 issued on Nov. 25, 1997 to Seiji Kato and subsequently assigned to Daiwa Seiko Inc. discloses an artificial bait which can provide a great effect to attract fish by light emissions or reflection from air bubbles contained in the artificial bait. A large number of air bubbles are enclosed within an artificial bait main body formed of elastic material having flexibility and light transmissible property wherein the air bubbles may be deformed to enhance the attractiveness of the bait.

U.S. Pat. No. 5,855,089 issued on Jan. 5, 1999 to Wayne F. Hockmeyer and Kenneth Daubert discloses a pliable bait minnow having a head, body, and a tail. Twin lower fins attached to the belly of the pliable bait minnow and an upper dorsal fin attached along the upper back. The body is translucent with light reflective particles dispersed throughout the pliable bait minnow. The fish is life-like in that it incorporates a two tone effect. The lower portion of the body having a lighter coloration. The middle portion of the body having a textured surface area resembling scales. The mouth includes a wire coil which attaches the pliable bait minnow to the hook.

U.S. Pat. No. 6,018,902 issued on Feb. 1, 2000 to Clyde Gudermuth, Daniel Stone, Charles Williams and Kevin Murray and subsequently assigned to EBSCO Industries, Inc. discloses a multi-layered iridescent reflective coating for a fishing lure and the method for applying the coating to the surface of the lure. The coating preferably comprises a base layer, an optical stack comprising at least 3 layers of refractive material, and a protective layer. The layers of refractive material are vacuum deposited on a lure pre-coated with an ultraviolet cured polymer base layer. The optical stack can be applied to painted lures, pre-colored lures, or undercoated lures. The substrate, or lure surface, does not affect the process but can yield varying iridescent effects, depending on the texture and color of the substrate surface. The relative thickness of each optical layer and its relation to the other layers in the optical stack combine to achieve a variety of iridescent effects. A protective layer having a low refractive index is applied over the finished optical stack.

Noticeably absent from the present art is a method and apparatus by which a bait fish, or other similarly intended likeness, may be applied to a three dimensional pliable fishing lure contour via a four-color print pad process. The present invention discusses, discloses and claims a method and apparatus by which such an advancement in the art of fishing lure fabrication can be appreciated.

BRIEF SUMMARY OF THE INVENTION

The present invention teaches a method and apparatus by which a bait fish or other likeness may be applied to a three dimensional pliable fishing lure contour via a four color pad print process. The present invention's print processing mold allows the nesting of a flexible three dimensional fishing lure contour and allows imprinting upon a flexible surface of a bait fish or other likeness. Consequently, it is an object of the instant invention to apply a bait fish likeness to a three dimensional pliable fishing lure contour via a four color pad print process.

A further object of the instant invention is to advance the art of fishing lure fabrication by teaching an apparatus to accommodate four color pad print processing of pliable fishing lures.

Yet another object of the instant invention is to advance the art of four color pad print processing to allow fabrication of pliable and realistic appearing fishing lures.

Yet an additional object of the instant invention is to imprint a realistic bait fish image on a flexible fishing lure.

A further object of the instant invention is to allow exactness of detail in the reproduction of fishing lure patterns via a four color pad print process.

An additional object of the invention is to provide a teaching of method and apparatus to allow mass production of realistic looking bait fish images upon a pliable fishing lure.

A further object of the instant invention is to teach a method by which a four color pad print process may be utilized to fabricate pliable fishing lures.

Yet a further object of the instant invention is to teach a method by which four color pad print processing ink will adhere to the surface of a pliable fishing lure contour.

Other objects and further scope of the applicability of the present invention will become apparent from the detailed description to follow, taken in conjunction with the accompanying drawings wherein like parts are designated by like reference numerals.

DETAILED DESCRIPTION OF THE PREFERRED EMBODIMENTS

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

Figure 1:
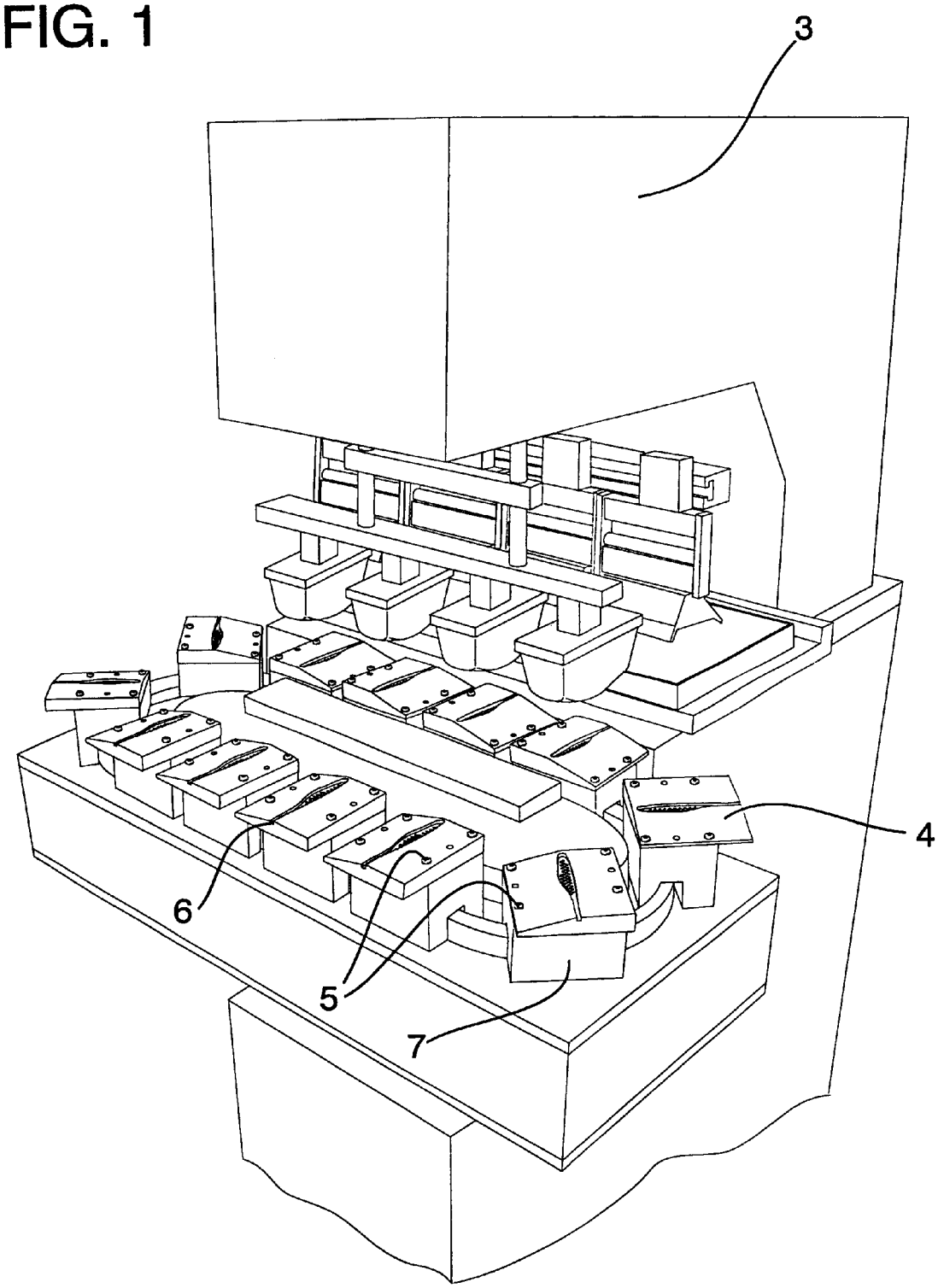
FIG. 1 illustrates the present invention as practiced in its preferred embodiment in association with a representative four color pad printing device.
Figure 2:
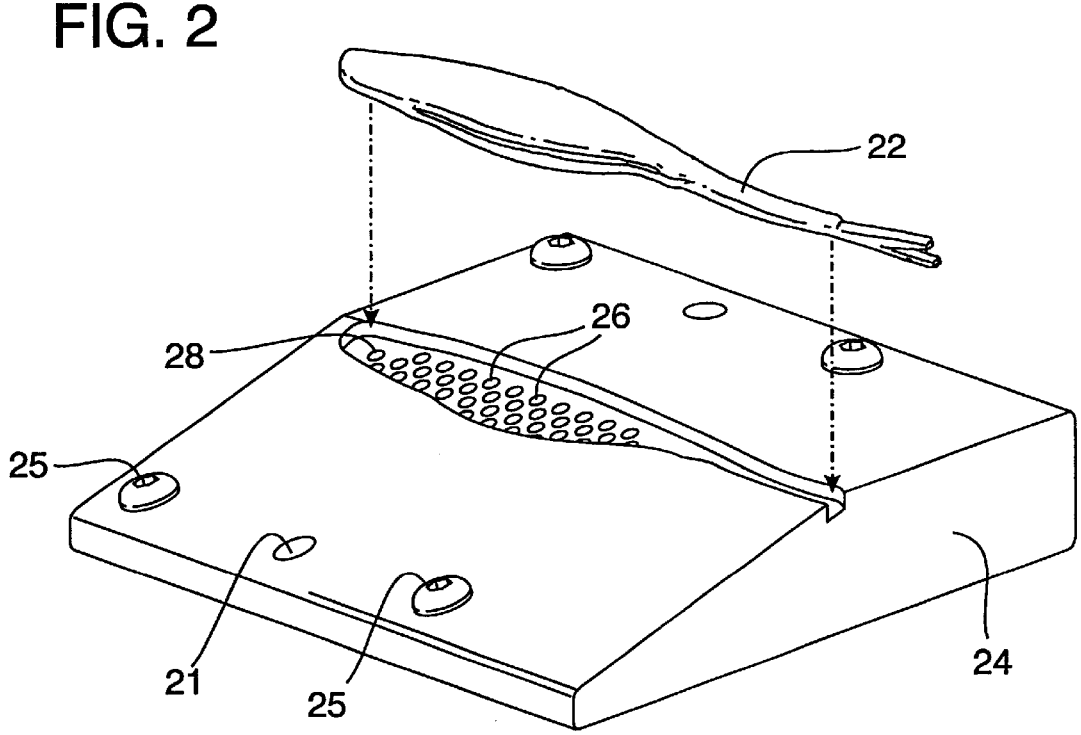
FIG. 2 is an illustration of the invention's fishing lure print process mold and a pliable fishing lure contour.

FIGS. 1 through 4 illustrate the invention as practiced in its preferred embodiment in association with a four color pad printing device and flexible fishing lure paint mold. In FIG. 1 a four color pad printing device 3 well known through the art is utilized to facilitate the imprinting of a bait fish or other similarly intended representation upon a flexible fishing lure contour. FIG. 1 further illustrates the invention's fishing lure print mold 4 attached to a four color printer platen 7. Said securing of mold 4 to platen 7 is facilitated via any number of securing means 5 well known to those skilled in the art including but not limited to securing pins, metal screws, bolts, etc. FIG. 1 further illustrates, and as will be provided in further detail in association with FIGS. 2 through 4, the invention's concave three dimensional impression 6 which is generally dimensioned to accommodate a three dimensional pliable fishing lure contour. When said contour is nested within said mold 6 the lure is held firmly in place as the imprinting of a four color bait fish image is imprinted upon the contour via standardized printing processes well known and practiced by those skilled in the art. Turning now to FIG. 2.

Figure 3:
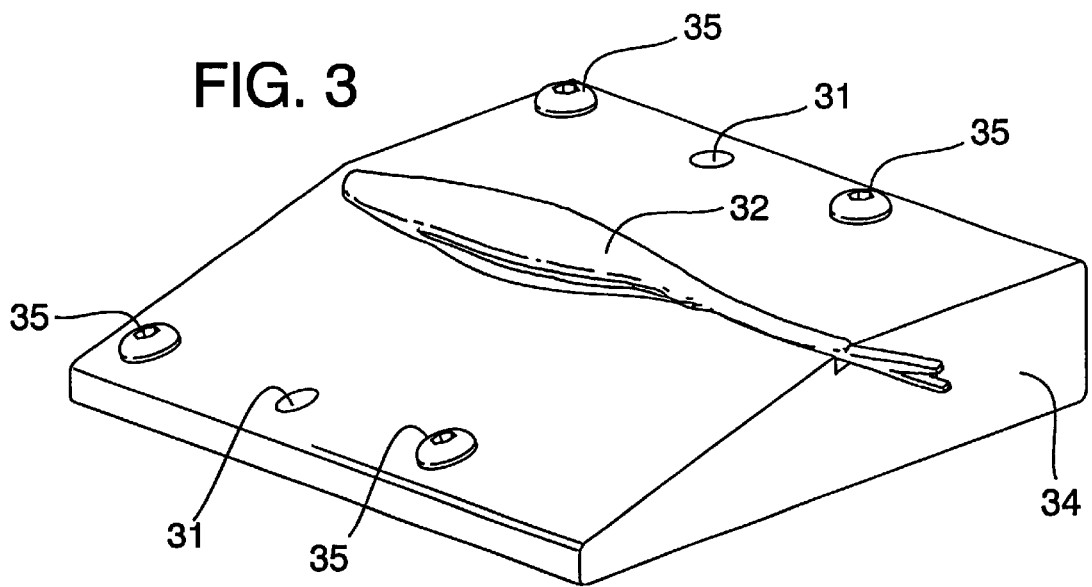
FIG. 3 is an illustration of the invention's print processing mold in its preferred embodiment with a pliable fishing lure contour nested within the mold.

In FIG. 2, an illustration of the invention's fishing lure print process mold 24 and a pliable fishing lure contour 22 are shown. A flexible lure contour 22 is illustrated and positioned prior to the nesting of said contour 22 within the concave three dimensional impression 28 incorporated within the pliable fishing lure print process mold 24. Once nested within the mold 24 vacuum accommodation apertures 26 are employed to further secure said contour 22 within said impression 28 and advances the art of fishing lure fabrication by teaching the use of such apertures 26 in association with a three dimensional pliable fishing lure contour 22. It is easily envisioned, though not as effective, to employ other teachings of the instant invention, absent such apertures 26. FIG. 2 also illustrates apertures 21 through which fastening means 25 are inserted to attach the mold 24 of the instant invention to the printing press platen 7 of the instant invention. Turning now to FIG. 3.

FIG. 3 illustrates the pliable fishing lure contour 32 inserted within the three dimensional concave impression (not shown) of the fishing lure mold 34. Also shown are illustrations of connection apertures 31 and connecting means, such as but not limited to pins, metal screws, bolts, etc. 35 used to facilitate the attachment of said mold 34 to the printing press platen 7. Turning now to FIG. 4.

Figure 4C:
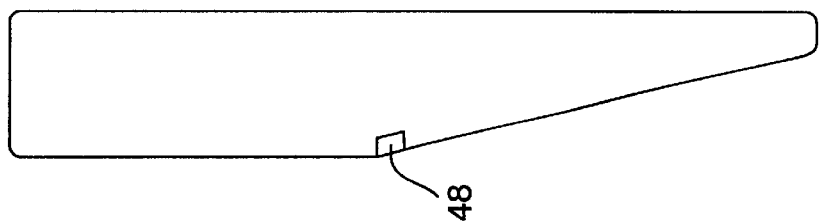
FIGS. 4A through 4C illustrate a top, first and second side perspective of the invention's fishing lure print processing lure mold.
Figure 4B:
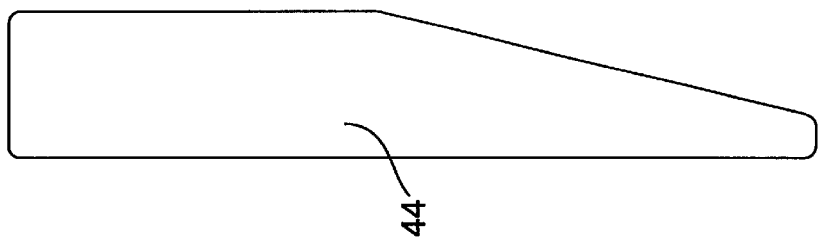
Figure 4A:
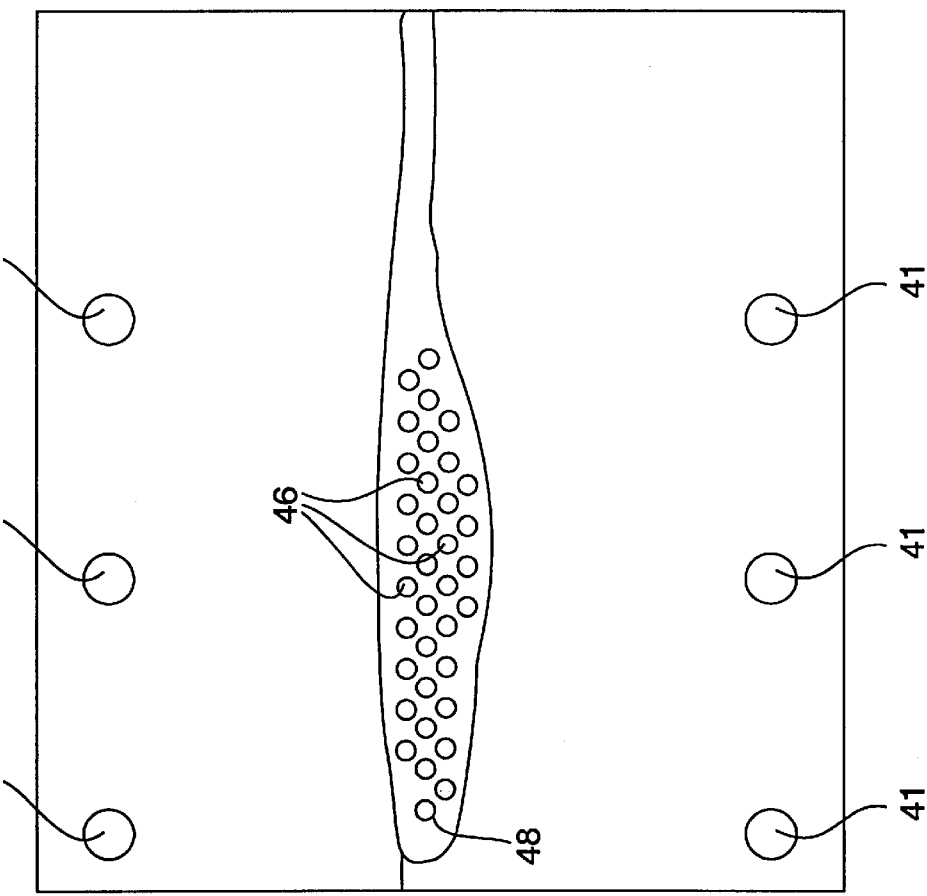

FIG. 4A illustrates a top view of the fishing lure print process mold 44 with the three dimensional concave impression 48 used for housing the pliable fishing lure contour. FIG. 4A also illustrates a plurality of vacuum apertures 46 used to further facilitate the securing of a pliable fishing lure contour when nested within the fishing lure print process mold 44. FIG. 4A further illustrates a plurality of apertures 41 for securing said mold 44 to the printing press platen (reference FIG. 1, element 7) absent any connection means such as bolts, metal screws, etc.

Figure 5:
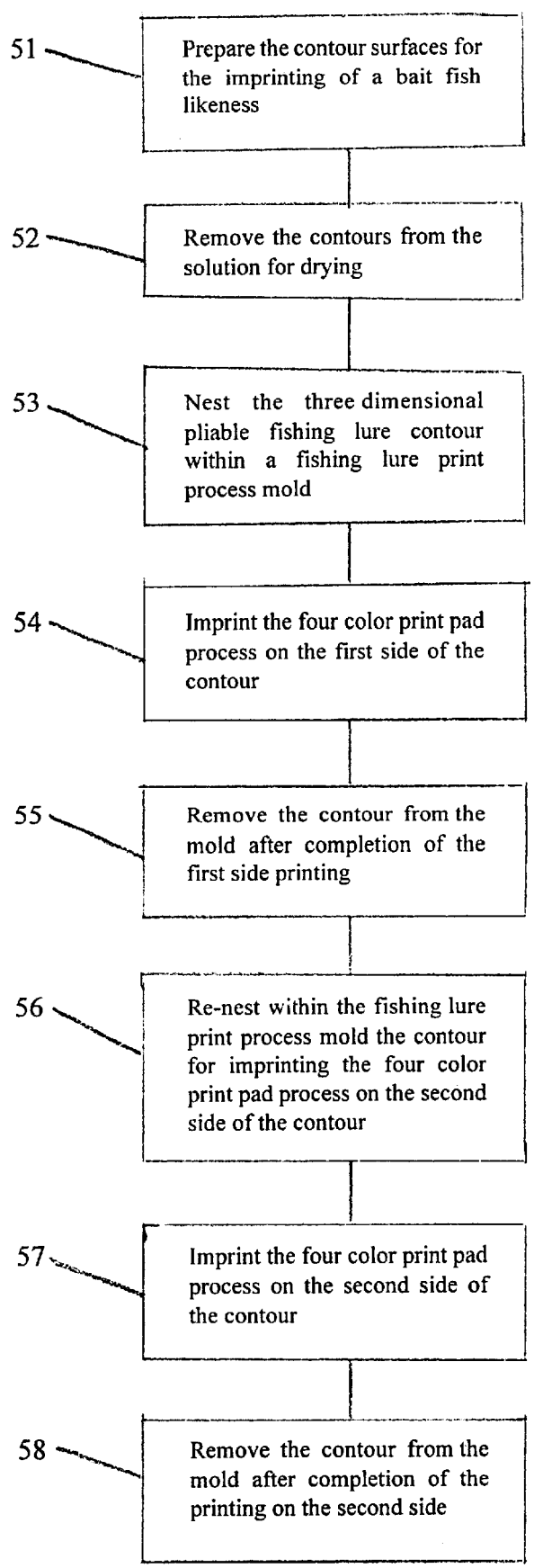
FIG. 5 is a block diagram illustrating the invention's preferred method for applying a bait fish likeness to a three dimensional pliable fishing lure contour via a four color pad print operation.

FIG. 4B illustrates a first side view of the fishing lure print processing mold while FIG. 4C illustrates a second side view of said fishing lure print processing mold 44, further partially illustrating the concave three dimensional impression 48 within which the pliable fishing lure contour is to be nested. Turning now to FIG. 5.

FIG. 5 illustrates a block diagram illustrating the method for applying a bait fish likeness to a three dimensional pliable fishing lure contour wherein 51 requires the surfaces of the three dimensional pliable fishing lure contour be prepared so that inks routinely utilized with a four color print pad process will adhere to the surface of the fishing contour. In preparing the contour for imprinting in experimentation it has been found that a solution of 50% methyl ethyl ketone and 50% isopropyl alcohol works best in general application. In typical applications, fishing lure contours are immersed in the afore noted solution and in instances of heavier colored bait design left to remain within the solution of 50% methyl ethyl ketone and 50% isopropyl alcohol for approximately 1 hour, to remove oily residue from the fishing lure contour. With respect to bait representations of a lighter color manifestation, it has been found through experimentation that leaving such contours immersed within a 75% methyl ethyl ketone and 25% isopropyl alcohol mix proves most effective to promote ink adhesion to such light colored lures.

Following the requisite degree of immersion time, the contours are removed from the solution and allowed to dry 52.

The next step in applying a bait fish likeness to a three dimensional pliable fishing lure contour requires nesting the surface prepared three dimiensional pliable fishing lure contour within a fishing lure print process mold 53. Via standard printing processes associated with four color pad printers, a four color bait fish likeness is imprinted upon a first side of said contour 54. The contour is then removed from said mold, subsequent to the completion of said first side imprinting 55 and re-nested within a fishing lure print process mold positioning said contour for imprinting a bait fish likeness upon the second side of the contour 56. The second side of the contour is then imprinted by a four color print pad process 57 and upon completion the pliable fishing lure is removed from the second side printing mold and made available for use 58.

While discussed and disclosed as a bait fish representation it is clearly evident that the teachings of the instant invention may be applied to utilize a four color print to imprint upon a pliable surface any color combination or representations so desired. Consequently, the claims as drafted are intended to extend beyond any limitation construed with utilization of the present invention strictly for representations of bait fish upon a pliable fishing lure contour.

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

Alternate Embodiments

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method for applying a bait fish likeness to a three dimensional pliable fishing lure contour comprising:

preparing surfaces of said contour for the imprinting of a bait fish likeness by immersing said contour within a solution of methyl ethyl ketone and isopropyl alcohol then removing said immersed contour from said solution and allowing contour to dry;

nesting said three dimensional pliable fishing lure contour within a concave impression fishing lure print process mold;

imprinting via a four color print pad process a bait fish likeness upon a first side of said contour;

removing said contour from said mold subsequent to completion of said first side imprinting;

re-nesting said three dimensional pliable fishing lure contour within said fishing lure print process mold, said re-nesting positioning said contour for imprinting a bait fish likeness upon a second side of said contour;

imprinting, via a four color print pad process a bait fish likeness upon a second side of said contour;

removing said contour from said mold subsequent to completion of said second side imprinting.

2. The method for applying a bait fish likeness to a three dimensional pliable fishing lure contour according to claim 1 wherein preparation of said contour further comprises:

immersing said contour within a solution of approximately 75% methyl ethyl ketone and 50% isopropyl alcohol;

removing said immersed contour from said solution and allowing contour to dry prior to said first said imprinting.

3. The method for applying a bait fish likeness to a three dimensional pliable fishing lure contour according to claim 1 wherein preparation of said contour further comprises:

immersing said contour within a solution of approximately 75% methyl ethyl ketone and 25% isopropyl alcohol;

removing said immersed contour from said solution and allowing contour to dry prior to said first side imprinting.

4. A pliable fishing lure having first and second sides imprinted in accordance with the process of claim 1.

* * * * *